(12) United States Patent
Higashitani et al.

(10) Patent No.: US 10,411,385 B2
(45) Date of Patent: Sep. 10, 2019

(54) CONNECTOR STRUCTURE FOR DEVICE CONNECTION

(71) Applicant: YAZAKI CORPORATION, Tokyo (JP)

(72) Inventors: Masanobu Higashitani, Shizuoka (JP); Masayuki Kataoka, Shizuoka (JP); Shigeo Mori, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/986,802

(22) Filed: May 22, 2018

(65) Prior Publication Data
US 2018/0358730 A1 Dec. 13, 2018

(30) Foreign Application Priority Data
Jun. 9, 2017 (JP) .................................. 2017-114367

(51) Int. Cl.
*H01R 13/24* (2006.01)
*H01R 13/03* (2006.01)
(Continued)

(52) U.S. Cl.
CPC ......... *H01R 13/2414* (2013.01); *H01R 13/03* (2013.01); *H01R 13/405* (2013.01);
(Continued)

(58) Field of Classification Search
CPC .. H01R 13/2414; H01R 13/03; H01R 13/405; H01R 13/521; H01R 13/5216
(Continued)

(56) References Cited

U.S. PATENT DOCUMENTS

| 6,210,173 B1 * | 4/2001 | Matsunaga | G01R 1/0483 439/591 |
| 6,274,826 B1 * | 8/2001 | Serizawa | H01H 23/003 200/1 B |
| 8,398,410 B2 * | 3/2013 | Yeh | B82Y 10/00 439/71 |

(Continued)

FOREIGN PATENT DOCUMENTS

| JP | 2-97759 U | 8/1990 |
| JP | 2010-129407 A | 6/2010 |

(Continued)

OTHER PUBLICATIONS

Japanese Office Action for the related Japanese Patent Application No. 2017-114367 dated May 28, 2019.

*Primary Examiner* — Tulsidas C Patel
*Assistant Examiner* — Marcus E Harcum
(74) *Attorney, Agent, or Firm* — Kenealy Vaidya LLP

(57) ABSTRACT

A connector structure includes a conductive rubber. The consecutive rubber is accommodated in an accommodating recess part of a first connector, and is configured to be sandwiched between a first terminal and a second terminal to electrically connect them when a first casing and a second casing are assembled so as to abut the first connector to a second connector. The conductive rubber includes both end surfaces which are contact points abutting against the first terminal and the second terminal, and a resilient part including a groove part formed on an outer circumference between the contact points so as to extend in a circumferential direction orthogonal to an axial direction connecting the end surfaces.

6 Claims, 8 Drawing Sheets

(51) Int. Cl.
  *H01R 13/405* (2006.01)
  *H01R 13/52* (2006.01)
  *H01R 13/631* (2006.01)
  *B60R 16/02* (2006.01)

(52) U.S. Cl.
  CPC ....... *H01R 13/521* (2013.01); *H01R 13/5216* (2013.01); *H01R 13/5219* (2013.01); *H01R 13/6315* (2013.01); *B60R 16/02* (2013.01); *H01R 2201/26* (2013.01)

(58) Field of Classification Search
  USPC .............................................. 439/86, 87, 90
  See application file for complete search history.

(56) References Cited

U.S. PATENT DOCUMENTS

| | | | | |
|---|---|---|---|---|
| 9,004,928 | B2* | 4/2015 | Tanaka | B60L 3/0069 439/86 |
| 2001/0016435 | A1* | 8/2001 | Fujimura | G01R 1/0483 439/66 |
| 2005/0174136 | A1* | 8/2005 | Zhou | G01R 1/06733 324/755.08 |
| 2006/0073716 | A1* | 4/2006 | Jeong | G06F 1/1616 439/86 |
| 2007/0227757 | A1* | 10/2007 | Moore | E21B 33/0385 174/92 |
| 2008/0057757 | A1* | 3/2008 | Arai | H01R 13/2414 439/86 |
| 2008/0242128 | A1* | 10/2008 | Hilty | H01R 13/2414 439/91 |
| 2013/0040473 | A1 | 2/2013 | Tanaka et al. | |
| 2013/0260578 | A1* | 10/2013 | Mason | H01R 12/714 439/66 |
| 2013/0309882 | A1* | 11/2013 | Lin | H01R 13/6591 439/86 |
| 2014/0193985 | A1 | 7/2014 | Wang et al. | |
| 2017/0005427 | A1* | 1/2017 | Higashitani | H01R 13/2407 |

FOREIGN PATENT DOCUMENTS

| | | |
|---|---|---|
| JP | 2012-94263 A | 5/2012 |
| JP | 2016-4718 A | 1/2016 |

* cited by examiner

CONNECTOR STRUCTURE FOR DEVICE CONNECTION

CROSS REFERENCE TO RELATED APPLICATIONS

This application is based on Japanese Patent Application (No. 2017-114367) filed on Jun. 9, 2017, the contents of which are incorporated herein by way of reference.

BACKGROUND

The present invention relates to a connector structure for device connection.

For example, as a connector structure for connecting each device such as a motor and an inverter of a hybrid car or an electric car or the like, a connector structure for device connection has been known in which the terminals of the connector of each device are electrically connected with conductive rubber (for example, refer to JP-A-2012-94263).

SUMMARY a connector structure for device connection according to the invention is characterized by the following configurations (1) to (5).
(1) A connector structure for device connection, including:
  a first connector, provided in a first casing of one device, and formed with an accommodating recess part;
  a second connector provided in a second casing of the other device;
  a first terminal provided in the first connector;
  a second terminal provided in the second connector; and
  a conductive rubber, accommodated in the accommodating recess part, and configured to be sandwiched between the first terminal and the second terminal to electrically connect the first terminal and the second terminal when the first casing and the second casing are assembled so as to abut the first connector and the second connector to each other, wherein
  the conductive rubber includes both end surfaces which are contact points abutting against the first terminal and the second terminal, and a resilient part including a groove part formed on an outer circumference between the contact points so as to extend in a circumferential direction orthogonal to an axial direction connecting the end surfaces.
(2) The connector structure for device connection according to (1), wherein
  the conductive rubber includes a seal part that abuts to and comes into close contact with a bottom part of the accommodating recess part around the first terminal.
(3) The connector structure for device connection according to (2), wherein
  a bottom groove part which surrounds the first terminal is formed at the bottom part of the accommodating recess part, and
  the seal part includes a lip part which is fitted to the bottom groove part.
(4) The connector structure for device connection according to any one of (1) to (3), wherein
  the conductive rubber includes a support part protruding in a radial direction orthogonal to the axial direction.
(5) The connector structure for device connection according to any one of (1) to (4), wherein
  the groove part is formed in the entire circumference of the conductive rubber.

BRIEF DESCRIPTION OF DRAWINGS

FIGS. 8A to 8C are views illustrating a modified example of the conductive rubber, wherein FIG. 8A is a perspective view of the conductive rubber, FIG. 8B is a cross-sectional view taken along the axial direction of the conductive rubber, and FIG. 8C is a cross-sectional view of the conductive rubber accommodated in an accommodating recess part taken along the axial direction.

FIGS. 9A to 9C are views illustrating another modified example of the conductive rubber, wherein FIG. 9A is a perspective view of the conductive rubber, FIG. 9B is a cross-sectional view taken along the axial direction of the conductive rubber, and FIG. 9C is a cross-sectional view of the conductive rubber accommodated in an accommodating recess part taken along the axial direction.

DETAILED DESCRIPTION OF EXEMPLIFIED EMBODIMENTS

When assembling the respective devices, the connectors of each device may be slightly tilted and joined. Then, the terminals of the connector are brought into contact with the contact points formed of the end surfaces of the conductive rubber with a slight inclination so that the contact becomes nonuniform, and the contact reliability between the conductive rubber and the terminals may be impaired.

The present invention has been made in view of the above circumstances, and an object thereof is to provide a connector structure for device connection in which connection reliability between terminals of connectors of each device and conductive rubber is improved.

Hereinafter, an embodiment of the present invention will be described with reference to the drawings.

Figure 1:
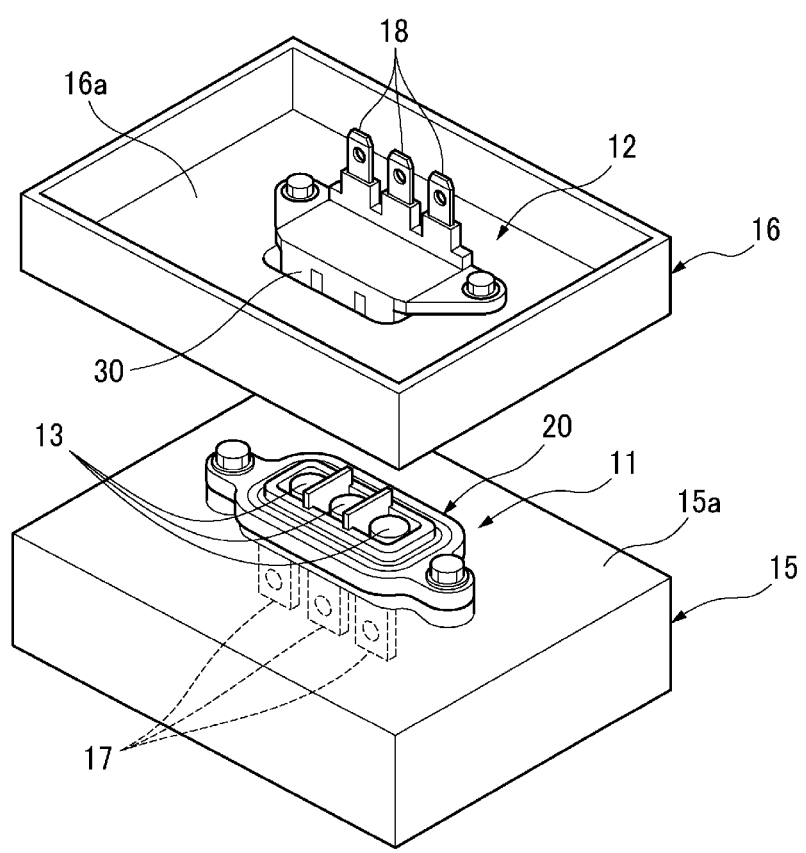
FIG. 1 is a perspective view of each casing to which a connector structure for device connection according to an embodiment is applied.

FIG. 1 is a perspective view of each casing to which a connector structure for device connection according to the present embodiment is applied.

As illustrated in FIG. 1, the connector structure for device connection according to the embodiment includes a first connector 11, a second connector 12, and conductive rubber 13. In the connector structure for device connection, for example, the respective devices such as a motor and an inverter of a hybrid car or an electric car or the like are connected to each other. The first connector 11 is provided, for example, in a casing 15 (a first casing) of a motor, which is one of the devices, and the second connector 12 is provided, for example, in a casing 16 (a second casing) of an inverter which is the other device. The first connector 11 is directly attached to an upper wall 15a of the casing 15 and the second connector 12 is directly attached to a lower wall 16a of the casing 16.

The first connector 11 includes a terminal 17 (a first terminal), and the second connector 12 includes a terminal 18 (a second terminal). The conductive rubber 13 is disposed between the terminal 17 of the first connector 11 and the terminal 18 of the second connector 12. The conductive rubber 13 electrically connects the terminals 17 and 18, when the casings 15 and 16 are assembled to each other to join the second connector 12 to the first connector 11.

Figure 2:
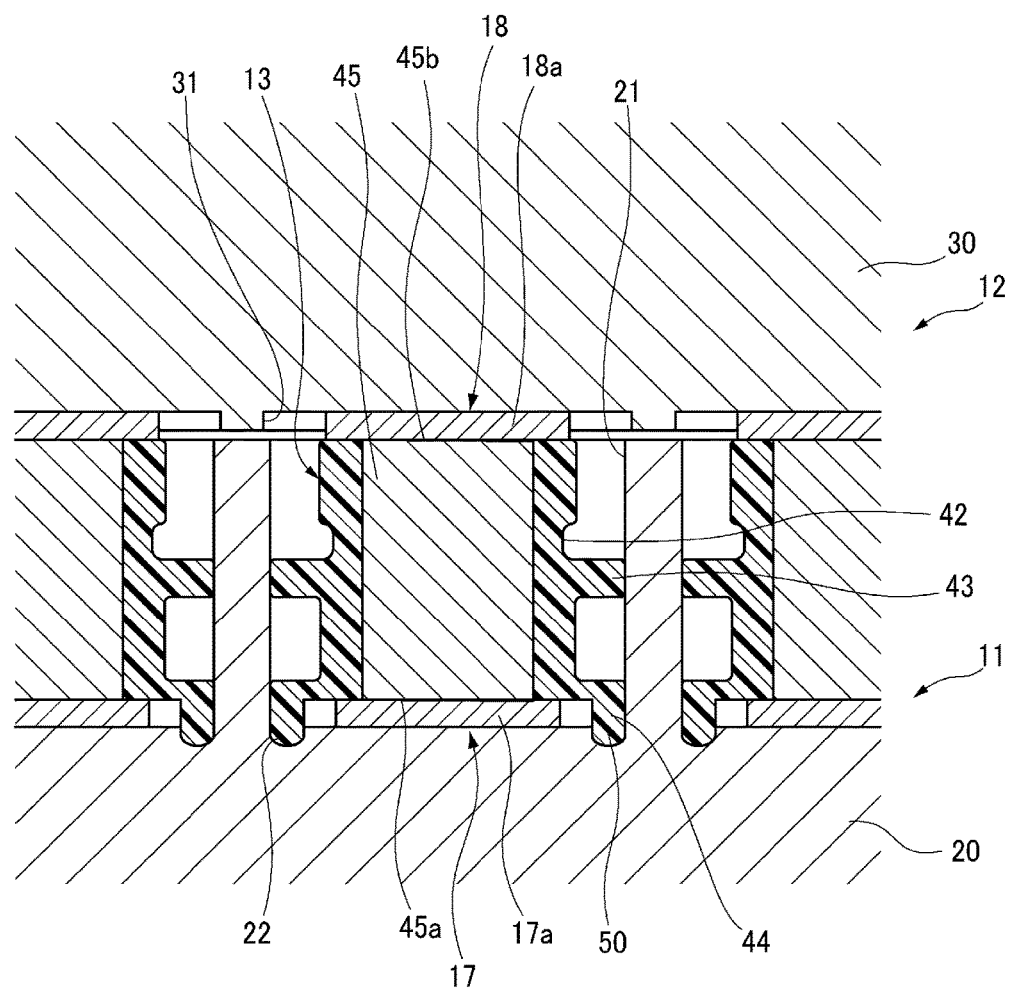
FIG. 2 is a cross-sectional view of a joining location formed by the connector structure for device connection according to the embodiment.

FIG. 2 is a cross-sectional view of a joining location formed by the connector structure for device connection according to the embodiment.

As illustrated in FIG. 2, the first connector 11 includes a housing 20. An accommodating recess part 21 is formed in the housing 20, and the conductive rubber 13 is accommodated in the accommodating recess part 21. The accommodating recess part 21 is formed in a rectangular shape in a plan view, and a contact plate part 17a formed on the terminal 17 is disposed on the bottom part thereof. A bottom groove part 22 is formed over the entire periphery in the periphery portion of the bottom part of the accommodating recess part 21, and the contact plate part 17a of the terminal 17 is disposed inside the bottom groove part 22.

The second connector 12 includes a housing 30. A recess part 31 is formed in the housing 30. The recess part 31 is formed in a rectangular shape in a plan view which is the same plane shape as the accommodating recess part 21. At the bottom part of the recess part 31, a contact plate part 18a formed on the terminal 18 is disposed.

By joining the second connector 12 to the first connector 11, the conductive rubber 13 accommodated in the accommodating recess part 21 is sandwiched between the contact plate parts 17a and 18a of the terminals 17 and 18 and slightly compressed.

Figure 3:
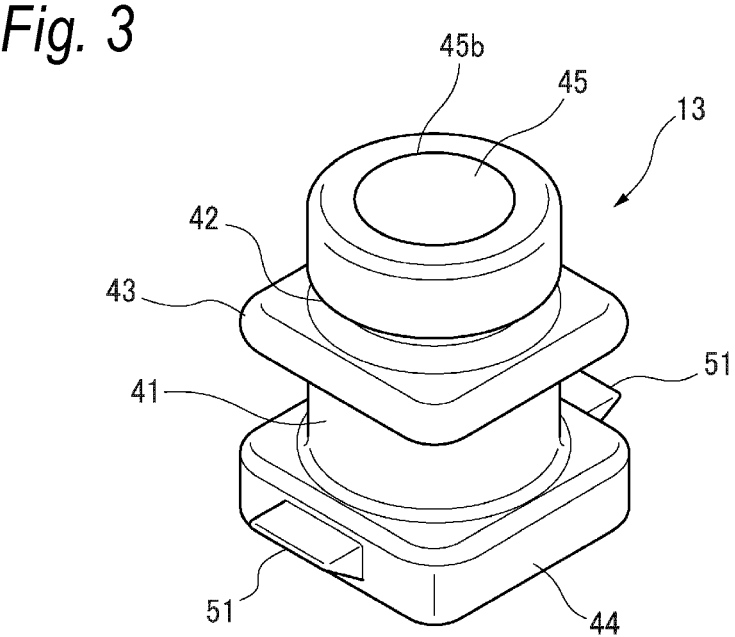
FIG. 3 is a perspective view illustrating conductive rubber as viewed from above.
Figure 4:
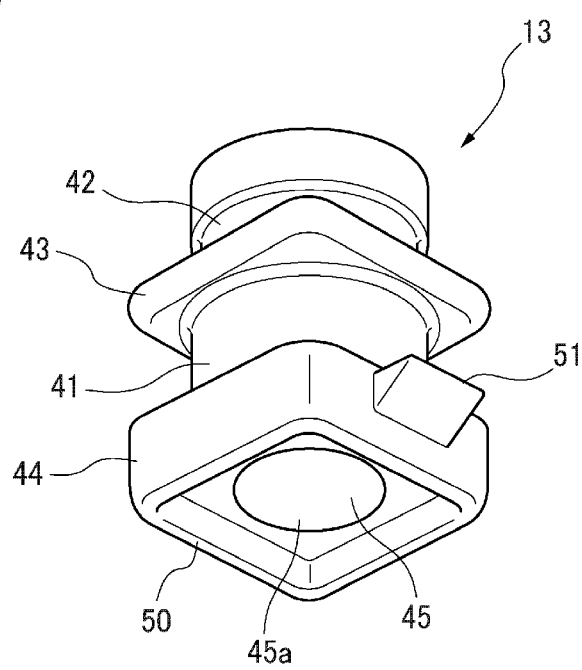
FIG. 4 is a perspective view illustrating the conductive rubber as viewed from below.
Figure 5:
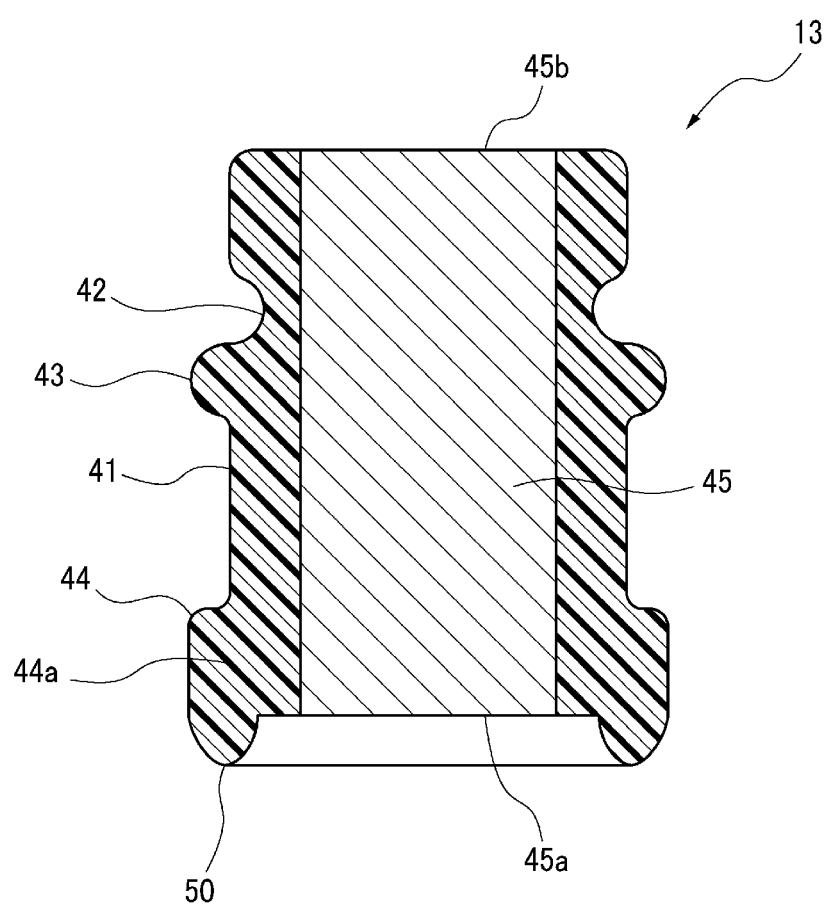
FIG. 5 is a cross-sectional view taken along an axial direction of the conductive rubber.
Figure 6:
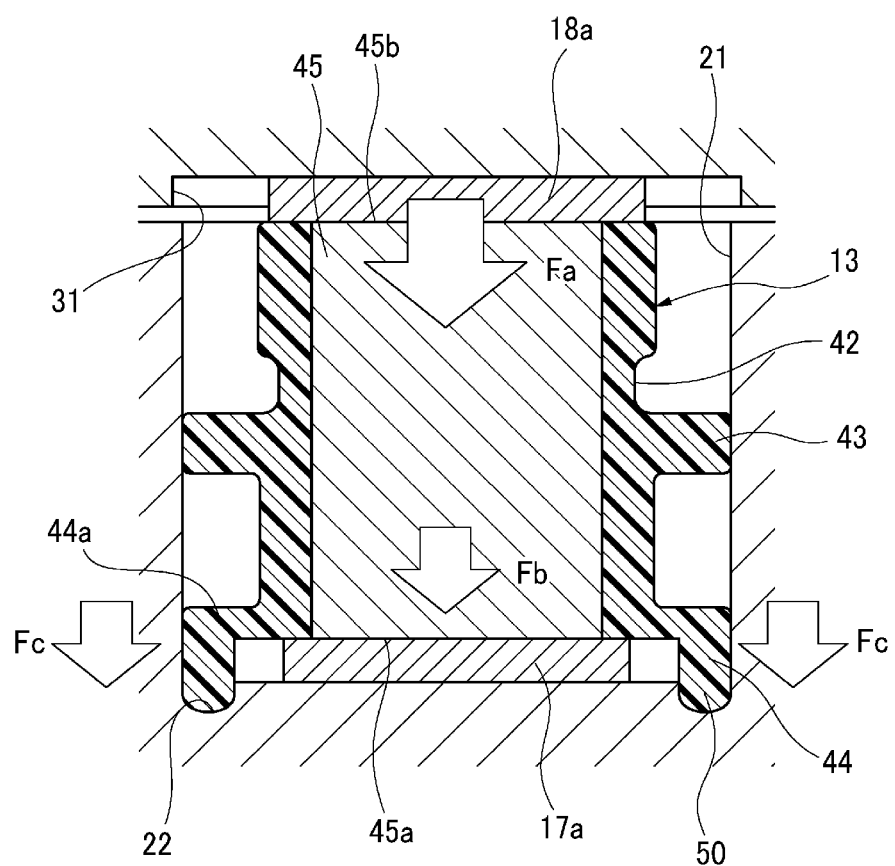
FIG. 6 is a cross-sectional view of a joining location in a state where a first connector and a second connector are joined.
Figure 7:
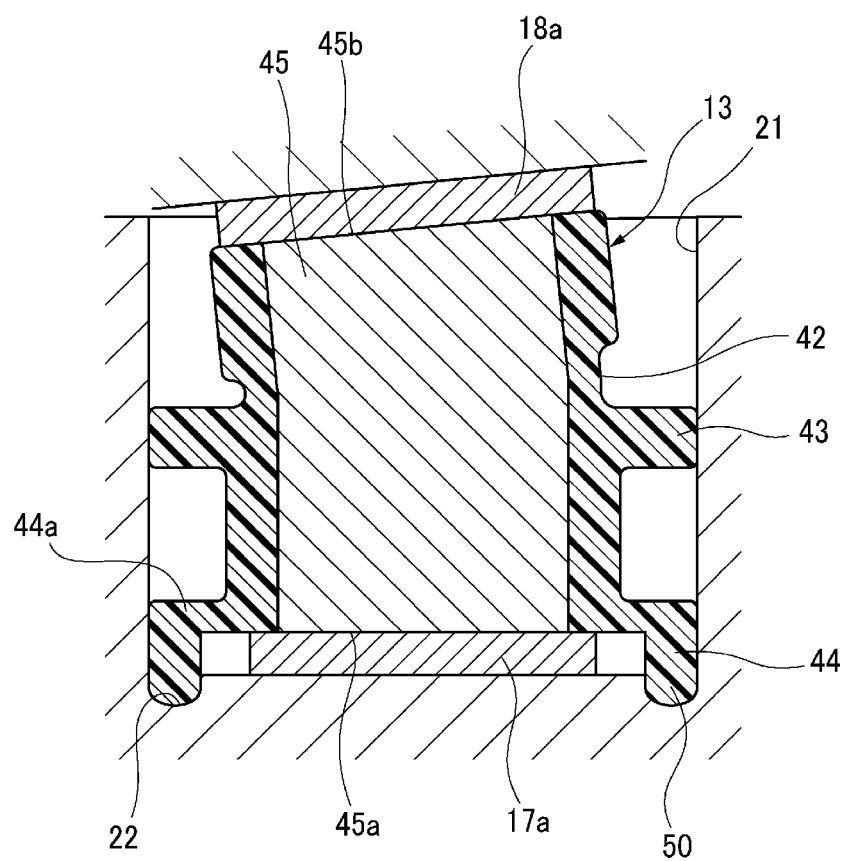
FIG. 7 is a cross-sectional view of a joining location in a state where the first connector and the second connector are joined with an inclination.

FIG. 3 is a perspective view of the conductive rubber as viewed from above. FIG. 4 is a perspective view of the conductive rubber as viewed from below. FIG. 5 is a cross-sectional view taken along the axial direction of the conductive rubber. FIG. 6 is a cross-sectional view of a joining location in a state where the first connector and the second connector are joined to each other. FIG. 7 is a cross-sectional view of a joining location in a state where the first connector and the second connector are joined to each other with an inclination.

As illustrated in FIGS. 3 to 5, the conductive rubber 13 includes a columnar part 41, a resilient part 42, a support part 43, and a seal part 44. As the conductive rubber 13, an elastic material such as thermoplastic or thermosetting synthetic rubber or synthetic resin is used. Specifically, a thermoplastic or thermosetting elastomer or the like can be used as the conductive rubber 13, but it is not particularly limited as long as it is a material having elasticity.

The columnar part 41 is formed in a columnar shape, and includes a conductive part 45 in its central portion. The conductive part 45 is formed by adding conductive metal powder, conductive carbon black, or the like to the elastic material. As the conductive part 45, a metal wire or a metal foil may be disposed on the elastic material. The conductive rubber 13 can be manufactured by, for example, insert molding, secondary processing of a molded product from this insert molding, or the like. The conductive rubber 13 has an anisotropic conductive rubber structure having elasticity due to the base material and conductivity attributable to the wire material.

The resilient part 42 is formed of a groove part formed on the outer periphery near the upper end of the columnar part 41, and is formed so as to extend in the circumferential direction of the columnar part 41. The circumferential direction is substantially orthogonal to an axial direction of the conductive rubber 13 connecting end surfaces of the conductive rubber 13 to contact with the terminals 17, 18. The columnar part 41 has a small diameter at the portion where the resilient part 42 is formed, and thus, the flexibility of the columnar part 41 is enhanced in the resilient part 42.

The support part 43 is formed in a plate shape protruding from the outer periphery of the columnar part 41. The support part 43 protrudes in a radial direction orthogonal to the axial direction. The support part 43 is formed in a rectangular shape in a plan view having a smaller outer shape than the accommodating recess part 21 of the housing 20. The support part 43 is formed to be closer to the lower end than the resilient part 42 in the columnar part 41.

The seal part 44 is formed on the outer circumferential side at the lower end of the columnar part 41. The seal part 44 is formed so as to protrude to the outer circumferential side of the columnar part 41, and is formed in a rectangular shape in a plan view having an outer shape slightly smaller than the accommodating recess part 21 of the housing 20. The seal part 44 includes a wrap part 44a wrapped in the axial direction with respect to the columnar part 41. In addition, the seal part 44 includes a lip part 50 protruding downward at an edge portion thereof. On the side surface of the seal part 44, locking claws 51 protruding in mutually opposite directions are formed. By accommodating the conductive rubber 13 in the accommodating recess part 21, the locking claw 51 enters into a locking hole (not illustrated) formed in the side surface of the accommodating recess part 21 and locks. Therefore, the conductive rubber 13 is prevented from being extracted from the accommodating recess part 21.

In order to join the first connector 11 and the second connector 12 to each other, in a state in which the conductive rubber 13 is accommodated in the accommodating recess part 21 formed in the housing 20 of the first connector 11, the second connector 12 approaches the first connector 11 from above. Then, the second connector 12 abuts against the first connector 11, and the casings 15 and 16 are fixed to each other.

In this way, as illustrated in FIG. 6, the conductive rubber 13 is compressed by the contact plate parts 17a and 18a of the terminals 17 and 18. As a result, the contact rubber parts 17a and 18a come into contact with the contact points 45a and 45b of the end surface of the conductive part 45 of the conductive rubber 13, and the terminals 17 and 18 are electrically connected to each other via the conductive part 45 of the conductive rubber 13.

In this way, in a state in which the second connector 12 abuts against and is joined to the first connector 11, a compressive force Fa applied from the contact plate part 18a to the conductive rubber 13 is divided into a pressing force Fb at which the conductive rubber 13 is pressed to the contact plate part 17a, and a pressing force Fc transmitted to the lip part 50 of the seal part 44 via the wrap part 44a to push down the lip part 50. As a result, the lip part 50 enters the bottom groove part 22 of the housing 20 by the pushing force Fc and comes into close contact with the inner surface of the bottom groove part 22. In addition, the seal part 44 pressed into the bottom groove part 22 expands to the outer circumferential side and is brought into close contact with the inner circumferential surface of the accommodating recess part 21. As a result, the contact location between the contact plate part 17a of the terminal 17 of the first connector 11 and the contact point 45a of the conductive rubber 13 is reliably sealed.

Meanwhile, when assembling the casings 15 and 16 of the device, the second connector 12 may be slightly tilted and joined to the first connector 11 in some cases. In such a case, as illustrated in FIG. 7, the contact plate part 18a of the second connector 12 obliquely abuts against the contact point 45b of the upper end of the conductive rubber 13. Then, the conductive rubber 13 is bent by the resilient part 42 formed of the groove formed on the outer periphery of the columnar part 41. As a result, the contact plate part 18a is evenly brought into contact with the contact point 45b of the conductive rubber 13. Further, when the conductive rubber 13 is bent and tilted by the resilient part 42, the support part 43 abuts against the inner surface of the accommodating recess part 21. As a result, excessive inclination of the conductive rubber 13 is suppressed.

As described above, according to the connector structure for device connection of the present embodiment, the conductive rubber 13 includes the resilient part 42 formed of the groove formed in the circumferential direction, on the outer periphery between the contact points 45a and 45b. As a result, even if the first connector 11 and the second connector 12 abut against each other in a state of being slightly inclined, the conductive rubber 13 is bent by the resilient part 42. As a result, the contact plate parts 17a and 18a of the terminals 17 and 18 are uniformly brought into contact with the contact points 45a and 45b formed by the end surfaces of the conductive rubber 13, and it is possible to obtain the high connection reliably between the terminals 17 and 18 via the conductive rubber 13.

By causing the first connector 11 and the second connector 12 to abut against each other, since the seal part 44 of the conductive rubber 13 abuts to and comes into close contact with the bottom part of the accommodating recess part 21 around the contact plate part 17a of the terminal 17, it is possible to reliably seal the contact location between the contact point 45a of the conductive rubber 13 and the contact plate part 17a of the terminal 17.

Moreover, since the lip part 50 of the seal part 44 is fitted into the bottom groove part 22 formed at the bottom part of the accommodating recess part 21, it is possible to more reliably seal the contact location between the contact point 45a of the conductive rubber 13 and the contact plate part 17a of the terminal 17.

In addition, when the conductive rubber 13 is bent and tilted by the resilient part 42, the support part 43 abuts against the inner surface of the accommodating recess part 21. As a result, excessive inclination of the conductive rubber 13 is suppressed and the posture is stabilized, and it is possible to maintain the good contact state between the contact points 45a and 45b on both end surfaces of the conductive rubber 13 and the contact plate parts 17a and 18a of the respective terminals 17 and 18, and the connection reliability can be improved.

Further, the present invention is not limited to the above-described embodiment, but can be appropriately modified, improved, and the like. In addition, materials, shapes, dimensions, numbers, placement locations, and the like of the constituent elements in the above-described embodiment are arbitrary as far as the present invention can be achieved, and are not limited.

Figure 8A:
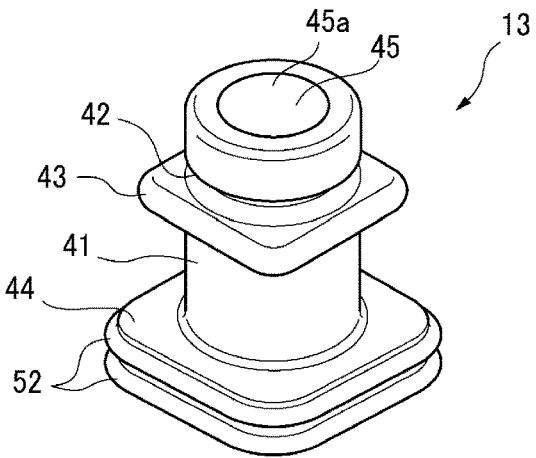
Figure 8B:
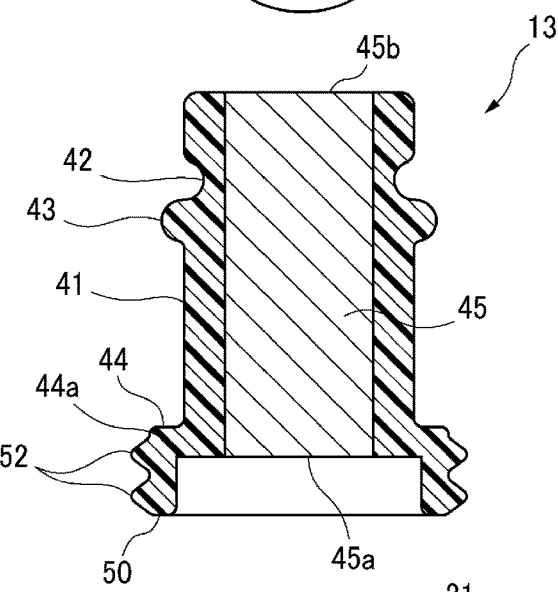
Figure 8C:
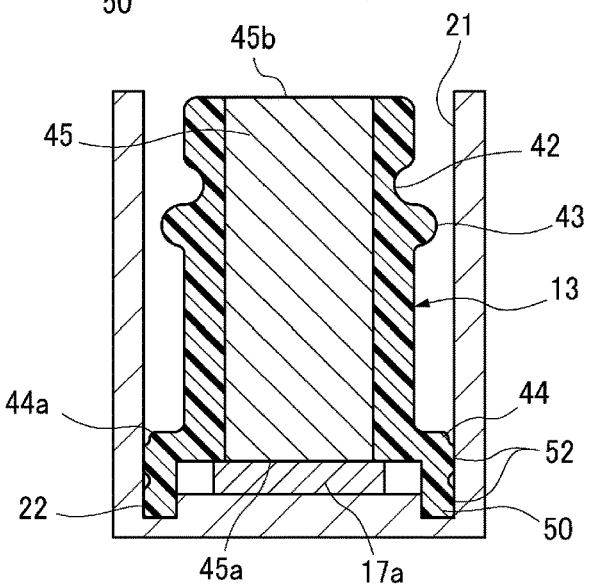

For example, as illustrated in FIGS. 8A to 8C, the lip part 52 may be formed on the outer circumferential surface of the seal part 44. In this way, when the first connector 11 and the second connector 12 are joined together, the lip part 52 is brought into close contact with the inner circumferential surface of the accommodating recess part 21. This makes it possible to further enhance the waterproof effect of the seal part 44.

Figure 9A:
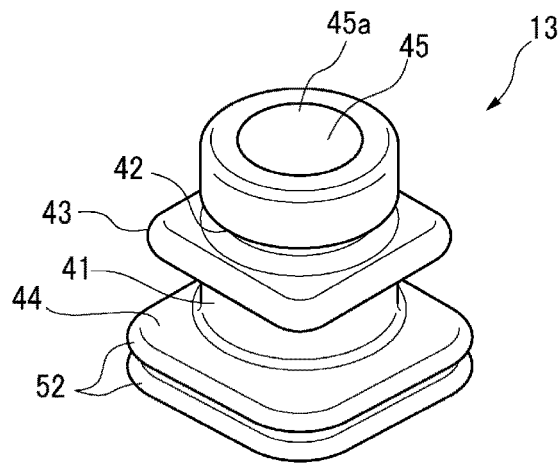
Figure 9B:
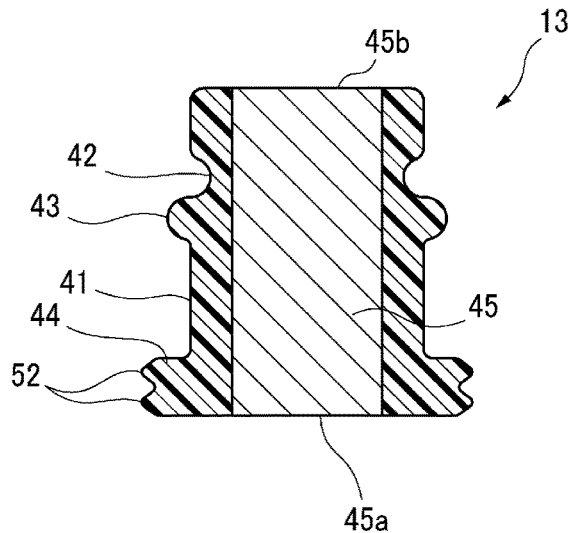
Figure 9C:
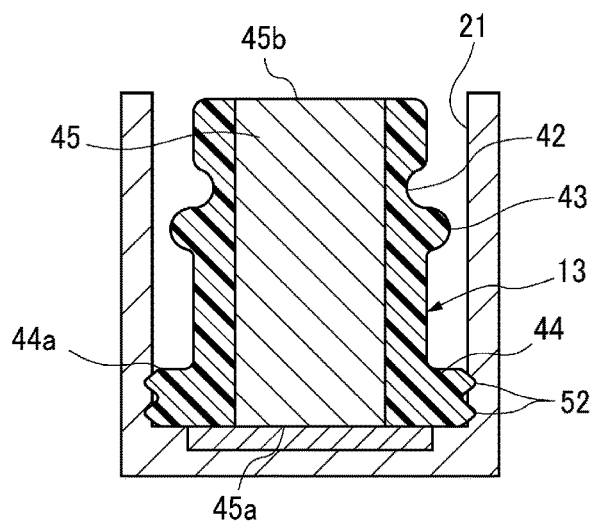

Further, as illustrated in FIGS. 9A to 9C, as the conductive rubber 13, in the case where the groove 22 is not formed on the bottom part surface of the accommodating recess part 21, the lip part 50 protruding downward is not provided, and the lip part 52 on the outer circumferential surface of the seal part 44 is formed. In this case, when the first connector 11 and the second connector 12 are joined together, since the lip part 52 is brought into close contact with the inner circumferential surface of the accommodating recess part 21, the waterproof effect of the seal part 44 can be obtained.

Here, the features of the embodiment of the connector structure for device connection according to the present invention described above are summarized briefly in the following [1] to [5], respectively.

[1] A connector structure for device connection, including:
a first connector (11), provided in a first casing (15) of one device, and formed with an accommodating recess part (21);
a second connector (12) provided in a second casing (16) of the other device;
a first terminal (17) provided in the first connector (11);
a second terminal (18) provided in the second connector (12); and
a conductive rubber (13), accommodated in the accommodating recess part (21), and configured to be sandwiched between the first terminal (17) and the second terminal (18) to electrically connect the first terminal (17) and the second terminal (18), when the first casing (15) and the second casing (16) are assembled so as to abut the first connector (11) and the second connector (12) to each other, wherein
the conductive rubber (13) includes both end surfaces which are contact points (45a, 45b) abutting against the first terminal (17) and the second terminal (18), and a resilient part (42) including a groove part formed on an outer circumference between the contact points (45a, 45b) so as to extend in a circumferential direction orthogonal to an axial direction connecting the end surfaces.

[2] The connector structure for device connection according to the description [1], wherein
the conductive rubber (13) includes a seal part (44) that abuts to and comes into close contact with a bottom part of the accommodating recess part (21) around the first terminals (17).

[3] The connector structure for device connection according to the description [2], wherein
a bottom groove part (22) which surrounds the first terminals (17) is formed at the bottom part of the accommodating recess part (21), and
the seal part (44) includes a lip part (50) which is fitted to the bottom groove part (22).

[4] The connector structure for device connection according to any one of the descriptions [1] to [3], wherein
the conductive rubber (13) includes a support part (43) protruding in a radial direction orthogonal to the axial direction.

[5] The connector structure for device connection according to any one of the descriptions [1] to [4], wherein
the groove part is formed in the entire circumference of the conductive rubber (13).

According to the connector structure for device connection described above, even when the first connector and the second connector abut to each other in a state of being slightly inclined, the conductive rubber is bent at the resilient part. Therefore, the contact point of the terminal is brought into uniform contact with the contact point formed of the end surface of the conductive rubber, so that the connection reliability between the terminals via the conductive rubber can be reliably obtained.

According to the connector structure for device connection described above, since the seal part of the conductive rubber abuts to and comes into close contact with the bottom part of the accommodating recess part around the terminal, the contact location between the contact point of the conductive rubber and the terminal can be reliably sealed.

According to the connector structure for device connection described above, the lip part of the seal part is fitted into the groove part formed in the bottom part of the accommodating recess part, so that the contact location between the contact point of the conductive rubber and the terminal can be further reliably sealed.

According to the connector structure for device connection described above, when the conductive rubber is bent at the resilient part to be inclined, the support part abuts against the inner surface of the accommodating recess part. As a result, excessive inclination of the conductive rubber is suppressed and the posture is stabled, so that it is possible to maintain the good contact state between the contact points on both end surfaces of the conductive rubber and the respective terminals, and the connection reliability can be improved.

According to the present invention, it is possible to provide the connector structure for device connection in which connection reliability between terminals of each connector of each device and conductive rubber is improved.

What is claimed is:

1. A connector structure for device connection, comprising:
   a first connector, provided in a first casing of one device, and formed with an accommodating recess part;
   a second connector provided in a second casing of another device;
   a first terminal provided in the first connector;
   a second terminal provided in the second connector; and
   a conductive rubber, accommodated in the accommodating recess part, and configured to be sandwiched between the first terminal and the second terminal to electrically connect the first terminal and the second terminal when the first casing and the second casing are assembled so as to abut the first connector and the second connector to each other, wherein
   the conductive rubber includes both end surfaces which are contact points abutting against the first terminal and the second terminal, and a resilient part including a groove part formed on an outer circumference between the contact points and spaced from sides of the accommodating recess part so as to extend in a circumferential direction orthogonal to an axial direction connecting the end surfaces and facilitate side bending by the resilient part at the groove part.

2. The connector structure for device connection according to claim 1, wherein
   the conductive rubber includes a seal part that comes into close contact with a bottom part of the accommodating recess part around the first terminal.

3. The connector structure for device connection according to claim 2, wherein
   a bottom groove part which surrounds the first terminal is formed at the bottom part of the accommodating recess part, and
   the seal part includes a lip part which is fitted to the bottom groove part.

4. The connector structure for device connection according to claim 1, wherein
   the conductive rubber includes a support part protruding in a radial direction orthogonal to the axial direction.

5. The connector structure for device connection according to claim 1, wherein
   the groove part is formed in the entire circumference of the conductive rubber.

6. The connector structure for device connection according to claim 1, wherein the resilient part bends at the groove part so as to uniformly bring into contact the first terminal and the second terminal with the contact points.

* * * * *